United States Patent
Johnston

(10) Patent No.: US 6,834,524 B2
(45) Date of Patent: *Dec. 28, 2004

(54) APPARATUS FOR SWAGING FERRULES

(75) Inventor: Lonnie E. Johnston, Aurora, OH (US)

(73) Assignee: Swagelok Company, Solon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/243,592

(22) Filed: Sep. 13, 2002

(65) Prior Publication Data

US 2003/0010085 A1 Jan. 16, 2003

Related U.S. Application Data

(63) Continuation of application No. 09/667,662, filed on Sep. 22, 2000, now Pat. No. 6,463,778.
(60) Provisional application No. 60/155,426, filed on Sep. 22, 1999.

(51) Int. Cl.[7] .............................................. B21D 39/04
(52) U.S. Cl. ........................ 72/316; 72/453.16; 29/237; 29/282
(58) Field of Search .............................. 72/316, 453.16, 72/453.15, 413; 29/237, 283.5, 282, 252

(56) References Cited

U.S. PATENT DOCUMENTS

| | | | | |
|---|---|---|---|---|
| 2,311,662 A | * | 2/1943 | Hunziker ...................... | 29/237 |
| 3,393,549 A | * | 7/1968 | Gregg .......................... | 72/316 |
| 3,662,452 A | * | 5/1972 | Stonestrom .................. | 29/282 |
| 3,691,604 A | | 9/1972 | Spontelli | |
| 3,722,064 A | | 3/1973 | Spontelli | |
| 3,728,771 A | | 4/1973 | Spontelli | |
| 3,810,296 A | | 5/1974 | Spontelli | |
| 3,972,112 A | * | 8/1976 | O'Sickey et al. ............. | 29/237 |
| 4,691,944 A | | 9/1987 | Viall, Jr. | |
| 4,873,755 A | | 10/1989 | Johnston | |
| 5,027,489 A | | 7/1991 | Johnston | |
| 5,040,400 A | * | 8/1991 | Nastasi ..................... | 72/453.16 |
| 5,357,666 A | * | 10/1994 | El Dessouky et al. .. | 29/243.523 |
| 5,765,428 A | * | 6/1998 | Lallier ..................... | 72/453.16 |
| 6,102,636 A | | 8/2000 | Geise | |

* cited by examiner

Primary Examiner—Daniel C. Crane
(74) Attorney, Agent, or Firm—Calfee, Halter & Griswold LLP

(57) ABSTRACT

Apparatus for swaging a ferrule or ferrules onto an outer wall of a cylindrical member includes a hydraulic power section and an adapter tool. The hydraulic section is disposed within a housing, and the adapter tool is at least partly retained in the housing and also is fully removable from the housing without affecting the hydraulic power section of the apparatus. The hydraulic section includes a piston that is moved under force of hydraulic pressure applied thereto from a hydraulic pressure source. The adapter tool includes a driven swaging die that is moved from a retracted position to an extended position in response to movement of the piston. The sleeve and anvil are releasably secured together so that the adapter tool can be removed from the housing as a unitary assembly. Size changes can be accommodated by removing a first adapter tool of a given size and replacing it with a second adapter tool of a different size. This changeover can be implemented without any disassembly or compromise of the hydraulic section. The apparatus also provide a visual indication that a swaging operation is completed by action of an indicator knob that axially pops out of the back end of the housing at the end of a swaging operation.

14 Claims, 8 Drawing Sheets

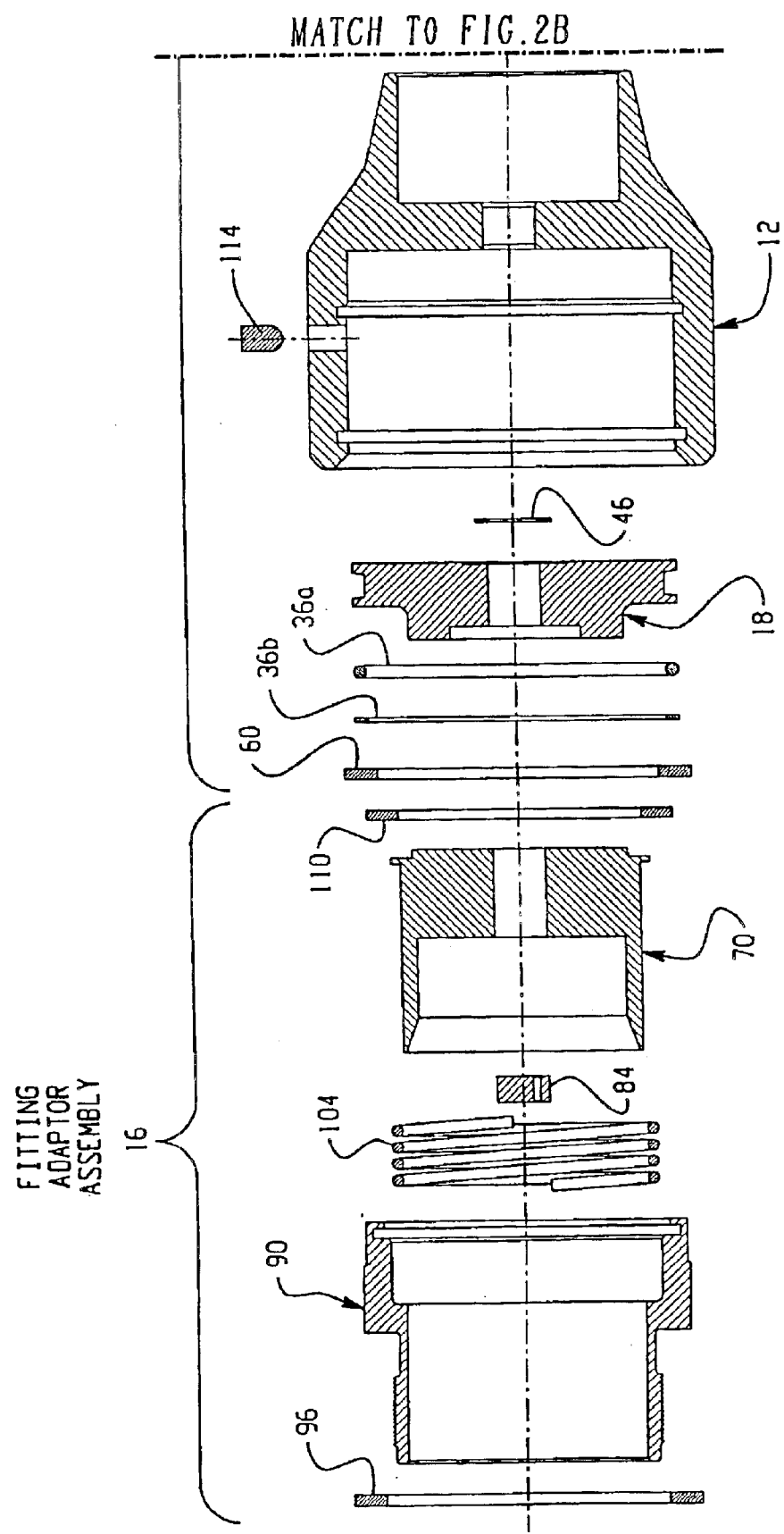

APPARATUS FOR SWAGING FERRULES

RELATED APPLICATION

This application is a continuation of U.S. patent application Ser. No. 09/667,662 filed on Sep. 22, 2000 now U.S. Pat. No. 6,463,778 for APPARATUS FOR SWAGING FERRULES, which claims the benefit of U.S. provisional patent application Ser. No. 60/155,426 filed on Sep. 22, 1999 for APPARATUS FOR SWAGING FERRULES the entire disclosures of which are fully incorporated herein by reference.

TECHNICAL FIELD OF THE INVENTION

The present invention relates to apparatus used to swage ferrules onto the outer wall of cylindrical member such as a tube end. More particularly, the invention relates to a swaging apparatus in which a hydraulic drive section is isolated and separable from a size adapter tool that includes a driven member that swages the ferrule by applying an axial force thereto against a coupling nut. This application claims the benefit of U.S.

BACKGROUND OF THE INVENTION

Ferrule type tube fittings are well known and characteristically include a threaded coupling nut, a threaded coupling body and one or more ferrules that fit inside the coupling nut. The coupling body typically includes a camming surface that engages a camming surface on a ferrule. A cylindrical member such as, for example, a tube end, is slid into the coupling body with the ferrules closely surrounding the outer wall of the tube end. When the coupling nut is installed onto the threaded end of the coupling body, an axial force is applied to the ferrule or ferrules which produces a swaging action thereby causing a radial displacement of portions of each ferrule body, causing the ferrules to tightly grip the outer wall of the tube end.

In many applications the fitting can be assembled with the use of simple hand tools such as wrenches. However, with larger tube sizes and with tubing made of harder materials, it is often necessary to use fluid pressure to apply sufficient force to properly swage the ferrules onto the tubing. Furthermore in some applications it is desirable to have the ability to assemble many fittings in an expedient manner.

Many types of power assisted swaging apparatus have been developed over the years. One type of such a tool is a hydraulic swaging apparatus in which a piston is driven axially by hydraulic pressure. The piston in turn displaces a driven member or anvil that applies the axial force to the ferrules. Such apparatus are described in U.S. Pat. Nos. 3,722,064; 3,810,296; 3,728,771; 4,873,755 and 5,027,489 the entire disclosures of which are fully incorporated herein by reference.

A characteristic of known swaging apparatus is that often times the driven member used to apply the axial force to the ferrules is integral with the hydraulic piston. If the same size ferrule or tubing is always going to be used, this is not an inconvenience, but as is more frequently the case, the apparatus must be able to swage ferrules of various sizes. Thus, a size change could require a disassembly of the hydraulic section as well. Alternatively, it is known to make the driven member separate from the piston, but even in such designs the driven member may be used to retain the piston in the apparatus housing, so that if size changes need to be made, the hydraulic section is probably going to be disassembled or at a minimum prone to leakage.

It is therefore an objective of the present invention to provide apparatus for swaging ferrules onto cylindrical members using fluid pressure, with the apparatus having substantial flexibility in making size changes without compromising or needing to disassemble the hydraulic drive section of the apparatus. It is a further objective to provide a more compact and user friendly swaging tool that is easier to use and provides a visual indication that a swaging operation has been successfully completed.

SUMMARY OF THE INVENTION

To the accomplishment of the aforementioned and other objectives, and in accordance with one embodiment of the invention, an apparatus for swaging a ferrule or ferrules onto an outer wall of a cylindrical member includes a hydraulic power section and an adapter tool. The hydraulic section is disposed within a housing, and the adapter tool is at least partly retained in the housing and also is fully removable from the housing without affecting the hydraulic power section of the apparatus. The hydraulic section includes a piston that is moved under force of hydraulic pressure applied thereto from a hydraulic pressure source connectable to the apparatus. The adapter tool includes a driven swaging member or anvil that is moved from a first or retracted position to a second or extended position in response to movement of the piston. The adapter tool also includes a threaded sleeve onto which a coupling nut can be installed. Preferably, but not necessarily, the sleeve and anvil are releasably secured together so that the adapter tool can be removed from the housing as a unitary assembly. Size changes can be accommodated by removing a first adapter tool of a given size and replacing it with a second adapter tool of a different size. This changeover can be implemented without any disassembly or compromise of the hydraulic section.

In accordance with another aspect of the invention, the apparatus includes a visual indicator that a swaging operation has been successfully completed. In the preferred embodiment, this visual indication is realized in the form of an indicator knob that pops out axially from the back end of the apparatus when a swaging operation is completed. The knob is reset manually before the start of the next swaging operation.

These and other aspects and advantages of the present invention will be apparent to anyone skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENTS

Figure 1:
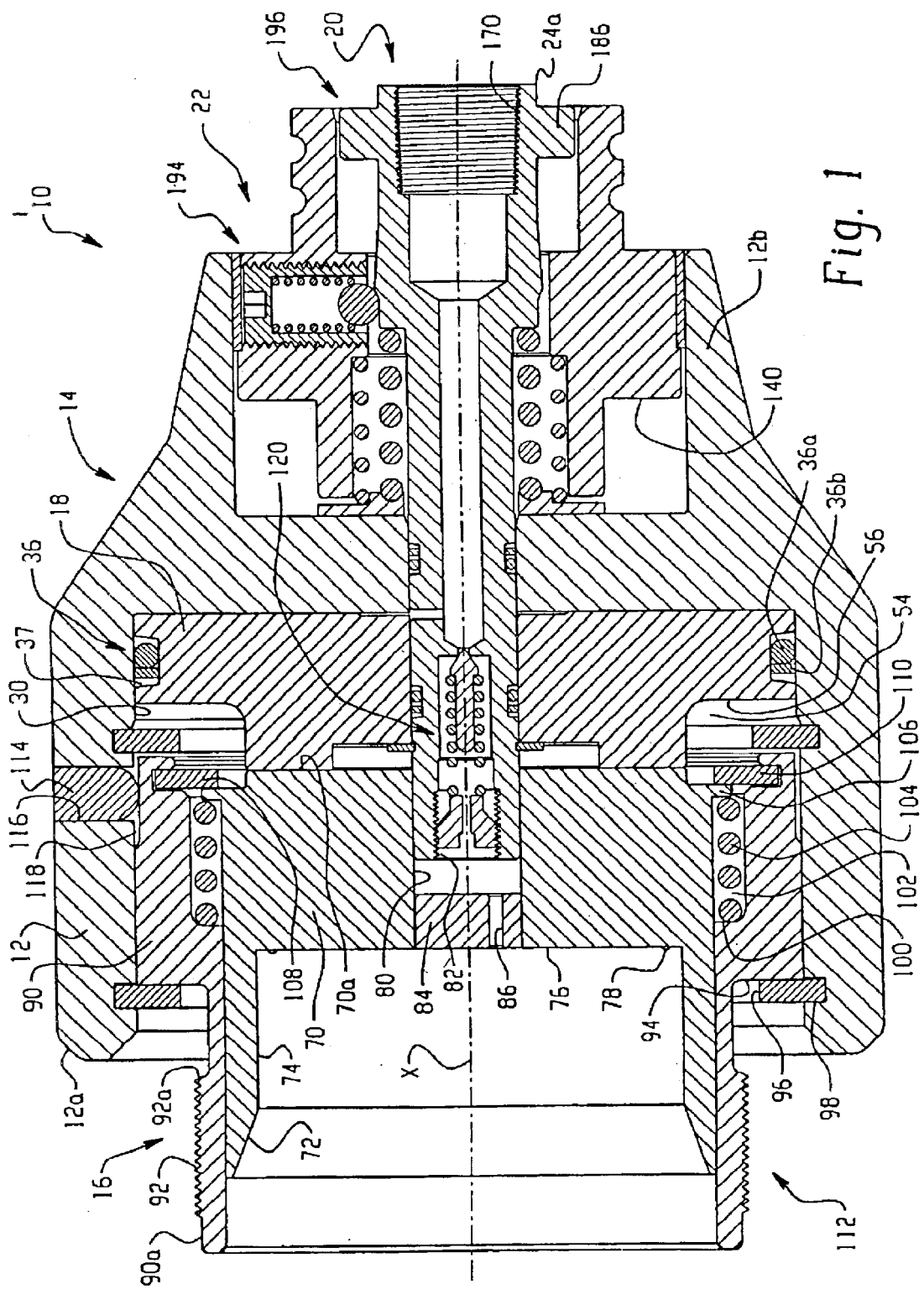
FIG. 1 is an apparatus for swaging ferrules in accordance with the present invention, illustrated in longitudinal cross-section in an initial position before a swaging operation.
Figure 2B:
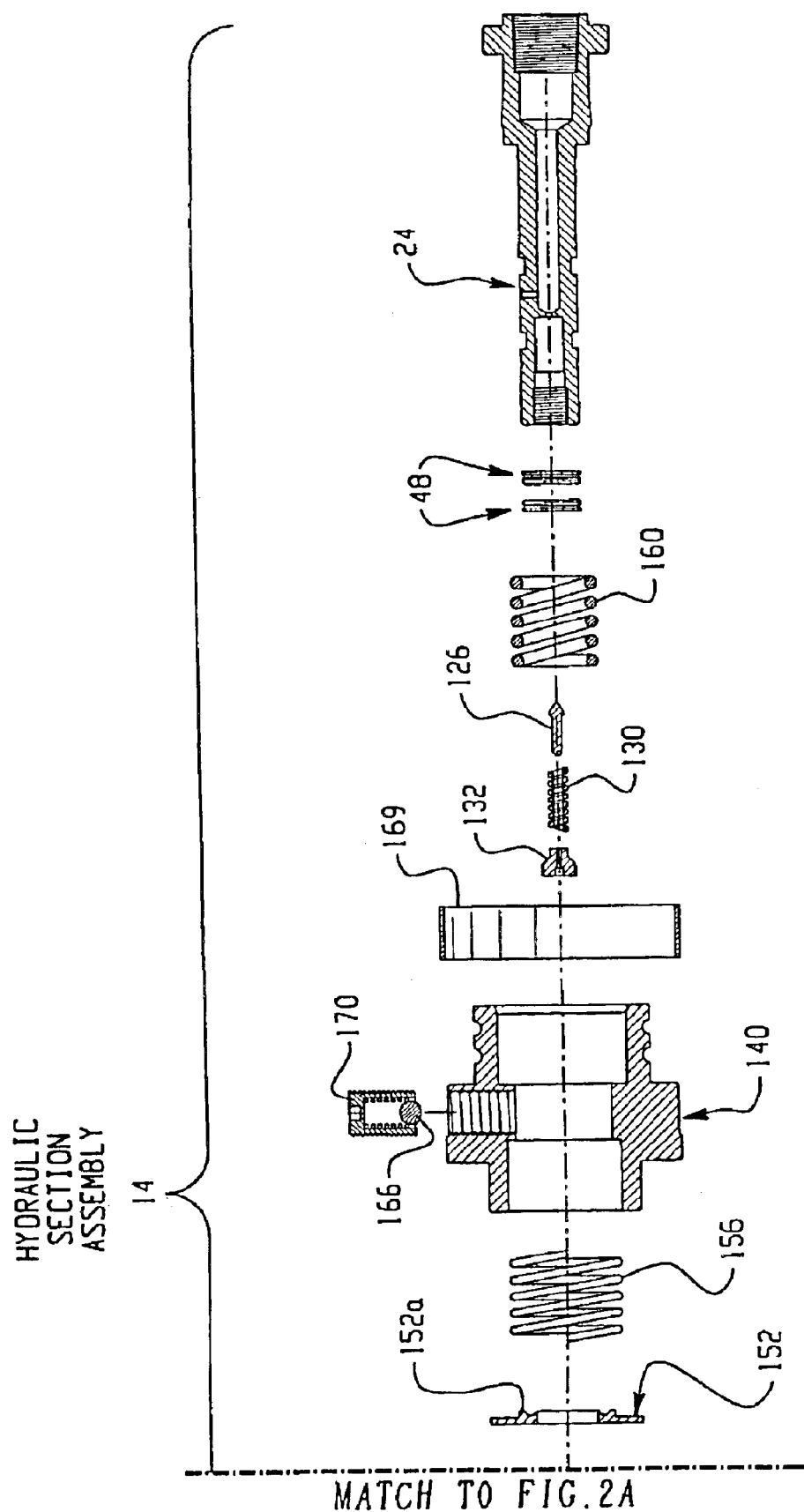
FIG. 2 is an exploded view of the apparatus in FIG. 1.
Figure 4:
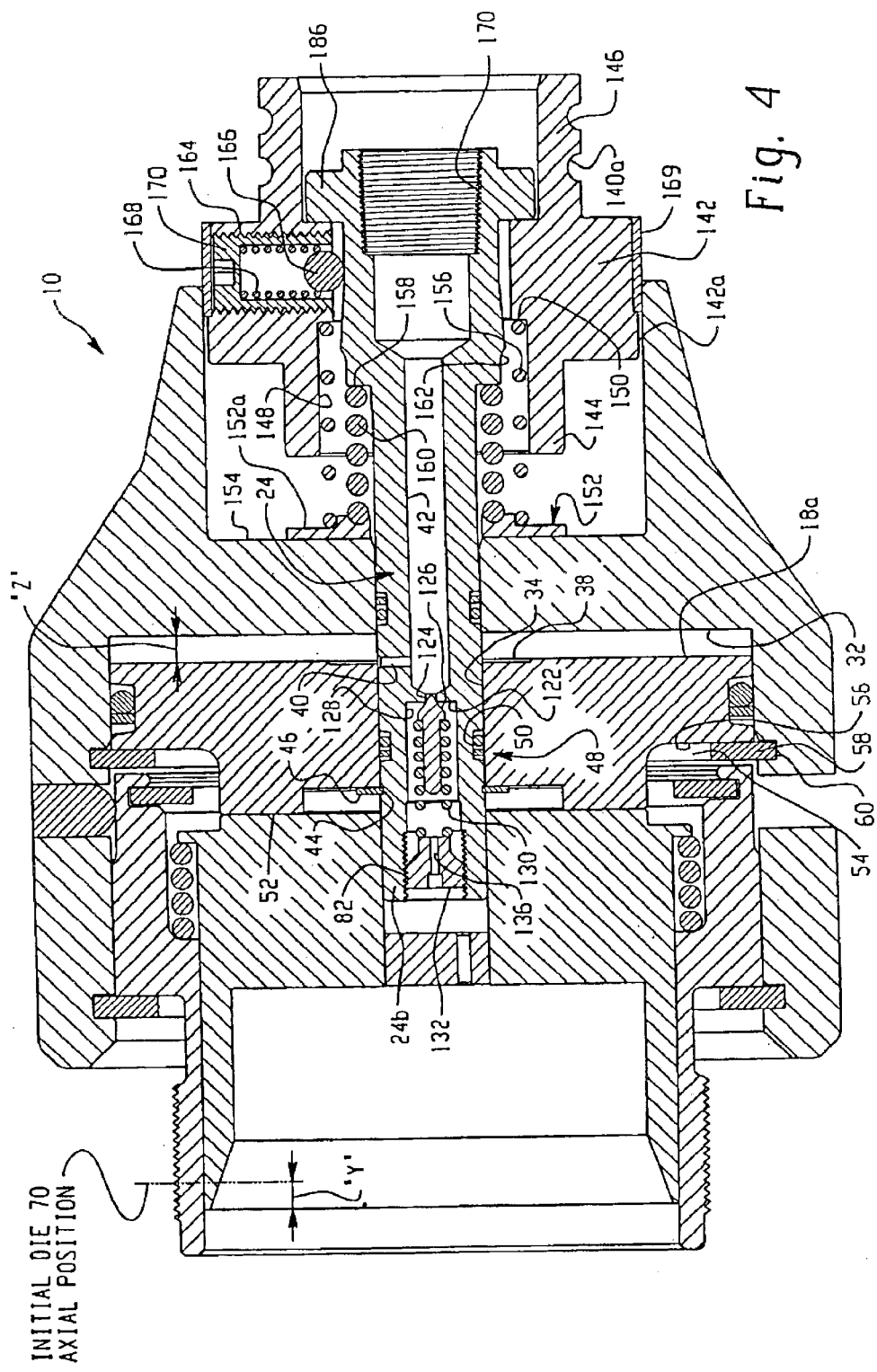
FIG. 4 is the apparatus of FIG. 1 illustrated in a second position at the end of a swaging operation before reset.

With reference to FIGS. 1 and 4, the invention will be described herein in an exemplary manner for swaging two ferrules of a conventional tube fitting onto a tube end, however, this is for purposes of illustration and explanation and should not be construed in a limiting sense. Those skilled in the art will readily appreciate that the invention described herein can be used to swage single ferrules onto tube ends, and further can be used to swage ferrules onto cylindrical members other than just tube ends, among them being cylindrical members such as tubing extensions on flow control devices to name one example. Additionally, various aspects of the invention are described herein, with the exemplary embodiment illustrating the use of various aspects of the invention together. Those skilled in the art, however, will readily appreciate that the individual aspects of the invention may be used individually or in any variety of combinations based on the operational requirements for a particular swaging operation or tool.

In accordance with the invention, the swaging apparatus is generally designated with the numeral 10. The swaging apparatus 10 is substantially self-contained within a housing 12, but for a connectable source of pressurized hydraulic fluid that is further described hereinafter. Other fluids could be used, including water with a hydrostatic pump, or gas pressure, for example.

The housing 12 can functionally be viewed as comprising two basic sections, a hydraulic power section 14 and a swaging section 16. The hydraulic section 14 includes a drive piston 18, a hydraulic connector assembly 20 and a swaging completion indicator assembly 22. An actuator shaft 24 extends through the housing 12 and lies along a central longitudinal axis X of the apparatus 10. The piston 18 is a generally cylindrical member that is centrally disposed within a piston bore 30 and in its retracted or returned position (as illustrated in FIG. 1) bottoms against a counterbore 32 of the housing 12. The piston 18 includes a central shaft bore 34 through which the actuator shaft 24 extends. A conventional piston seal ring 36 is provided in a seal recess 37 to seal the piston 18 against the housing bore 30 to prevent hydraulic fluid loss. In this example, the seal 36 includes an elastomeric o-ring 36a and a Teflon™ backing ring 36b which functions to prevent extrusion of the seal 36a under pressure. Different seal arrangements can be used as required. Similar seal arrangements are provided on the shaft 24 as indicated in the drawings.

The piston 18 is appropriately dimensioned and machined to allow for low friction translation along the central axis X. The piston 18 further includes a hydraulic fluid recess 38 that extends radially from the shaft bore 34 and is in fluid communication with a transverse bore 40 in the actuator shaft 24. The recess 38 forms a small fluid cavity that hydraulic fluid enters to apply pressure to the back side 18a of the piston 18. When hydraulic fluid under pressure is supplied to the cavity 38 and back side 18a the piston 18 is forced or moved forward or to the left as viewed in FIG. 1.

A central longitudinal bore 42 extends from the back or inlet end of the actuator shaft 24a just beyond the location of the transverse bore 40. The longitudinal bore 42 opens into the recess 38. By this arrangement, hydraulic fluid is supplied to drive the piston 18.

The actuator shaft 24 includes a circumferential recess 44 that receives and retains a removable snap ring 46. When the snap ring 46 is installed with the piston 18 positioned on the actuator shaft 24, the piston 18 is axially captured between the snap ring 46 and the housing wall 32. When the piston 18 is forced axially forward it pushes on the snap ring 46 thus also driving the shaft 24 forward therewith. The snap ring 46 also causes the piston 24 to be returned to the reset position illustrated in FIG. 1 when hydraulic pressure is removed from the piston 24 (the shaft 24 is biased rearward as viewed in FIG. 1 by a shaft spring 160 further described herein). A second piston seal arrangement 48 is provided in a seal groove 50 formed in the actuator shaft 24 at a location that is axially forward of the piston recess 38 to seal against fluid loss along the inner piston shaft bore 34.

The piston 18 includes a reduced diameter piston drive face 52. The reduced diameter of the drive face 52 as compared to the diameter of the piston 18 at the back end thereof forms a circumferential space 54 that is bounded by a piston stop surface 56. A second and removable snap ring 58 is positioned in a groove 60 formed in the housing 12 just axially forward of the piston 18 when the piston is in the retracted position illustrated in FIG. 1. The snap ring 58 limits the maximum axial stroke of the piston 18 by interfering with the stop surface 56 when the piston has moved forward a distance that is defined by the axial gap between the stop surface 56 and the back surface of the snap ring 58.

The piston 18 drive face 52 drivingly contacts or engages a swaging die or anvil 70 at a back side 70a thereof. The swaging die 70 is a generally cylindrical structure with a tapered forward mouth 72. This tapered mouth 72 engages a front ferrule F1 and applies a camming action to swage the ferrule onto a tube end, as will be further described hereinafter. The swaging die 70 includes an inner bore 74 that closely receives a tube end (not shown in FIG. 1). The tube end is inserted until it bottoms on a counterbore 76. The counterbore 76 is provided with a raised ridge or bead 78 that is shown in an exaggerated size in FIG. 1. This bead 78 forms a small indentation in the tube end after a proper swaging operation, thus providing a positive and visually simple verification that the tube end was fully inserted into the die 70 prior to the swaging operation.

The swaging die 70 includes a central shaft bore 80. A forward end 24b of the actuator shaft 24 extends forward into the die bore 80. A baffle plug 84 is installed into the bore 80. The plug 84 includes a through hole 86 that allows hydraulic fluid to drip out of the die 70 when the relief valve 120 is open.

The swaging die 70 is slideably retained within a generally cylindrical adapter sleeve 90. The adapter sleeve 90 is partly retained within the housing 12, and a forward portion 90a thereof extends axially beyond the forward end 12a of the housing. The adapter sleeve 90 is dimensioned to be installed into the housing 12 by a slip fit. The slip fit installation makes installation easier and the adapter 90 is less prone to damage such as damage to threads. The forward end of the adapter sleeve 90a includes an externally threaded portion 92 onto which an internally threaded coupling nut (not shown in FIG. 1) can be installed. The diameter of the end portion 90a is smaller than the diameter of the main sleeve body portion 90b, thereby forming a forward retainer face 94. A retainer in the form of a third removable snap ring 96 is fitted into a groove 98 formed in the forward portion of the housing 12. The snap ring 98 is used to securely retain the adapter sleeve 90 axially in position within the housing 12.

The adapter sleeve 90 includes a counterbore 100 that is of a larger diameter than the outer diameter of the swaging die 70. The swaging 70 die and the adapter sleeve 90 thus form an annulus 102. A spring 104 is disposed in the annulus 102 and is held in compression between the counterbore 100 and an outward extending flange 106 formed near the back end 70a of the swaging die 70. The spring 104 axially biases the swaging die 70 and the adapter sleeve 90 apart. The adapter sleeve 90 includes a snap ring groove 108 formed near the back end of the sleeve 90. A retainer in the form of a fourth removable snap ring 110 engages the back face of the die flange 106 to hold the adapter sleeve 90 and the swaging die 70 together as a single unitary adapter tool assembly 112. Other mechanisms for holding the sleeve 90 and die 70 together as an assembly 112 may be used, as will be readily apparent to those skilled in the art. For example, a threaded collar may be used in place of the fourth snap ring 110, or the die 70 may be coined with the sleeve 90.

When assembled as in FIG. 1, the spring 104 is not fully compressed, thereby permitting a limited but predetermined amount of relative axial movement between the die 70 and the sleeve 90. This permits the adapter tool assembly 112 to be installed into the housing 12 after the piston 18 is installed, with positive engagement between the piston 18 and the die 70. After the assembly 112 is installed, there is still sufficient space for the spring 104 to be compressed. In this manner, axial displacement of the piston 18 in the forward direction causes a corresponding forward displacement of the die 70. Tolerances are controlled so that the piston 18 hits the snap ring 58 before the spring 104 becomes fully compressed into a cylindrical incompressible form. This allows the maximum swaging stroke to be tightly controlled by controlling the axial gap between the piston face 56 and the snap ring 60, rather than having to control the dimensions of the spring 104. Note that, in the absence of hydraulic pressure in the passage 42, the spring 104 biases the die 90 and the piston 18 rearward towards the retracted or pre-swage position illustrated in FIG. 1. However, the fourth snap ring 110 limits the extent to which the spring 104 pushes the piston 18 to the wall 32; rather another bias spring is used for that purpose as will be apparent hereinafter.

In accordance with one feature of the invention, the adapter assembly 112 is purposefully designed to be removable from the housing 12 without compromising the integrity of the hydraulic section 14. The dimensions of the adapter sleeve 90 and the swaging die 70 are directly related to the size of the ferrules being swaged, the tube diameter, and the size of the associated coupling nut. Thus, in order to swage different size ferrules and tubing, the swaging die 70 and the adapter sleeve 90 must be easily interchangeable. Different sized couplings can be accommodated with the apparatus 10 simply by using a different adapter assembly 112. The slip fit installation of the adapter assembly 112 simplifies and speeds up change over without compromising the hydraulic section 14.

Because of the threaded engagement between the coupling nut and the adapter sleeve 90, the sleeve 90 may tend to rotate when a coupling nut C is installed onto the adapter sleeve 90. This rotation may be undesirable in some applications, and therefore an anti-rotation pin 114 may be installed in a transverse hole 116 through the housing 12. The hole 116 is positioned adjacent an axial slot 118 formed in the outer periphery of the adapter sleeve 90 at the back end thereof. By installing the pin 114 first before the assembly 112 is installed, the assembly 112 can be easily oriented during installation to align the slot 118 with the protruding end of the anti-rotation pin 114.

The shaft 24 may be provided with a relief valve assembly 120. The relief valve assembly 120 is used to prevent over pressurizing the hydraulic section 14 of the apparatus 10. This may be particularly important when a manually operated hydraulic pump is used to provide the hydraulic pressure for operating the apparatus 10. In a portion of the shaft 24 downstream from the transverse bore 40, a counterbore 122 is formed, and a valve orifice 124 extends therethrough. A poppet-style relief valve stem 126 is centrally disposed in a valve chamber 128 formed in the actuator shaft 24. A valve bias spring 130 is disposed in the valve chamber 128 and biases the valve poppet 126 closed as illustrated in FIG. 1. A valve set screw 132 is threadably inserted into the threaded bore 82 of the actuator shaft 24. Adjusting the axial position of the screw 132 in the bore 82 sets the pressure at which the relief valve will crack open to relieve excess hydraulic pressure. The set screw 132 and the baffle plug 84 include through bores 136, 86 respectively through which hydraulic fluid is released to reduce excess pressure in the hydraulic section 14. The reduced orifice 124 prevents a high flow of hydraulic fluid when the valve 120 opens. The presence of fluid in the swaging die 70 can be readily detected and the pressure relieved at the source. Once the pressure drops, the valve 120 closes, thereby preventing the loss of an excess amount of hydraulic fluid.

In accordance with another aspect of the invention, the indicator assembly 22 is used to provide immediate visual and audible feedback to the operator that a swaging operation has been completed. This helps the operator from over pressurizing the hydraulics or over swaging the fluid coupling. In this exemplary embodiment, the indicator 22 is realized in the form of an indicator knob 140 that axially pops out of the back end of the housing 12 at the end of a swaging operation.

The indicator knob 140 is a generally cylindrical element that includes a central body portion 142, a forward end 144 and a back end 146. The forward end 144 includes a central axial bore 148 having an inward shoulder 150 at the back end thereof.

A spring alignment washer 152 is provided around the actuator shaft 24 against a counterbore 154 in the housing 12. A knob spring 156 is disposed between the washer 152 and the shoulder 150 in the knob bore 148. This spring biases the knob 140 rearward as viewed in FIG. 1, or in other words to a position that indicates completion of a swaging operation. In FIG. 1 the knob 140 is in the pre-swage position, and in FIG. 4 the knob 140 is illustrated in the popped-out position after a swaging operation is completed.

The actuator shaft 24 further includes an outward extending shoulder 158. A shaft spring 160 is positioned in the knob bore 148 between the washer 152 and the shaft shoulder 158. The shaft spring 160 biases the shaft 24 away from the tool end of the assembly 10, or in other words the spring 160 biases the shaft 24 so as to return the piston 18 to the initial or retracted position illustrated in FIG. 1.

The shaft 24 is further provided with a ball detent 162 in the form of a tapered shoulder that extends radially outward from the shaft 24 body. The indicator knob 140 includes a transverse threaded bore 164 within the knob central body 142. The bore 164 is positioned such that when the knob 140 is in the reset position of FIG. 1, the bore 164 is radially aligned with the ball detent 162. A detent ball 166 is positioned in the bore 164 and a detent spring 168 is captured within the bore 164 between the ball 166 and a threaded detent retainer screw 170. Note that in practice there are actually three (or more) detent balls used that are evenly spaced around the circumference of the indicator knob 140 (only one ball 166 is shown in the drawings). The use of the three balls keeps the indicator knob 140 centered. Adjustment of the position of the detent retainer screw 170 in the bore 164 is used to adjust the force of the detent ball 166 against the detent shoulder 162. This force must be sufficient to prevent the ball 166 from being displaced against the spring 168 due to the rearward bias applied to the knob 140 by the knob spring 156. Alternatively, the detent ball 166, spring 168 and screw 170 may be a single subassembly within a threaded housing (not shown) that is installed into the bore 164. The indicator knob 140 may be knurled as at 140a to assist in gripping the knob 140 to reset its position. The shaft 24 includes a flange 186 that keeps the knob 140 on the shaft after it pops out. The knob 140 is dimensioned so that in its reset position illustrated in FIG. 1 the central body portion 142 is hidden from view by the rear portion 12b of the housing 12. An anti-tamper sleeve 169 may be slipped over the knob 140 to cover the detent mechanism. This sleeve may be colored so as to provide indication that the indicator knob 140 has tripped.

The back end of the shaft 24 includes the hydraulic connector assembly 20. In this embodiment, the connector 20 is an internally threaded end of the actuator shaft 24. A threaded end connector of a hydraulic hose is installed into this bore. In the illustrated embodiment (see FIG. 3), a swivel fitting 172 is installed on the outlet of the hydraulic pump 190. The fitting 172 may be conventional in design and retains a hydraulic hose coupling 182 at the end of a hydraulic hose end from the hydraulic source 190. The swivel fitting 172 simplifies connection of the hydraulic hose to the apparatus 10 by adjusting for twist or misalignment of the hydraulic hose relative to the apparatus 10.

Figure 3:
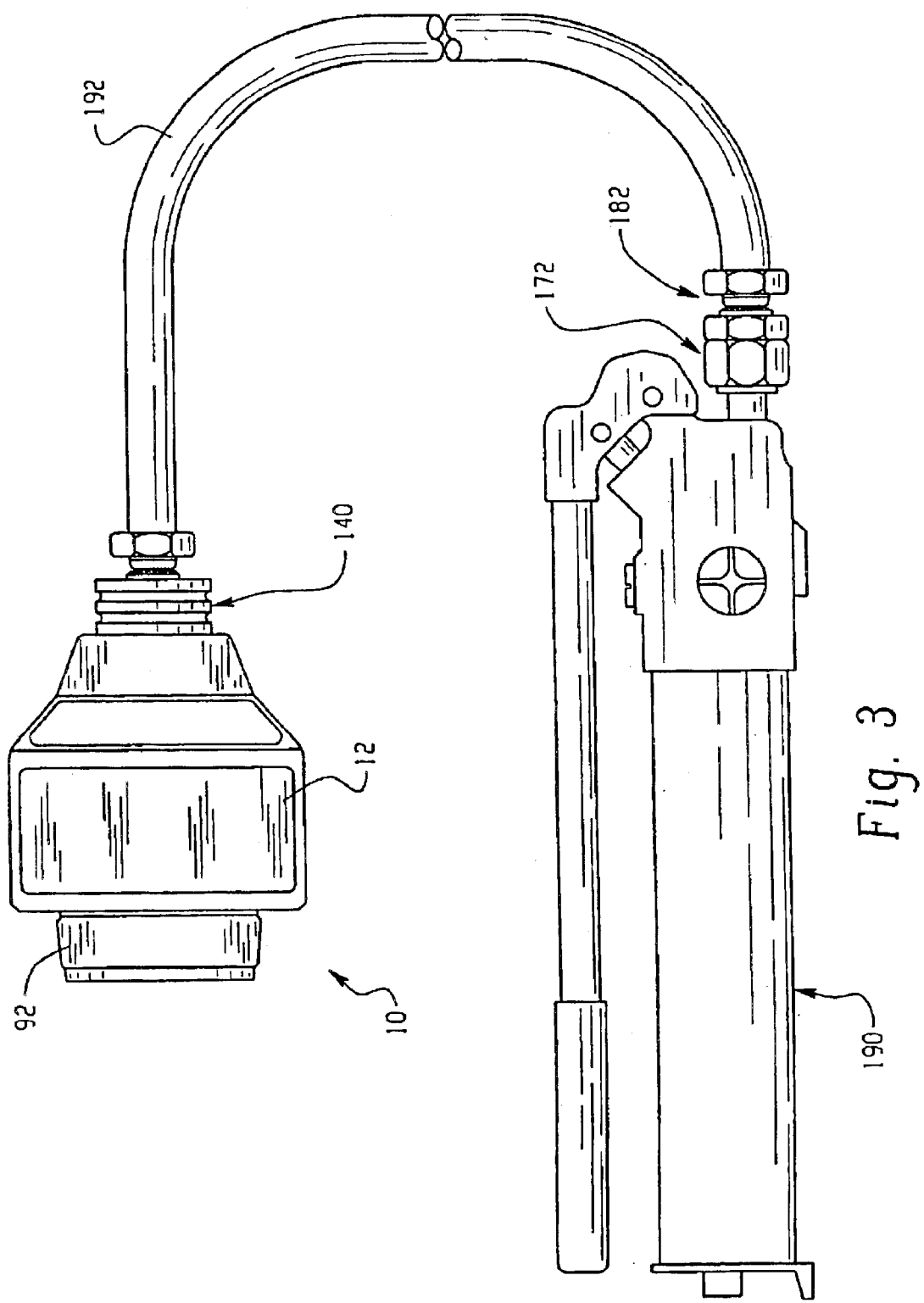
FIG. 3 is a schematic representation of the apparatus of FIG. 1 assembled for use with a hydraulic source.

In FIG. 3 the apparatus 10 is illustrated connected to a hydraulic pump 190 via a hydraulic hose 192. In this example, the pump 190 may be any conventional hand operated hydraulic pump, such as model no. P-12 available from Power Team, Owatonna, Wis.

Figure 6:
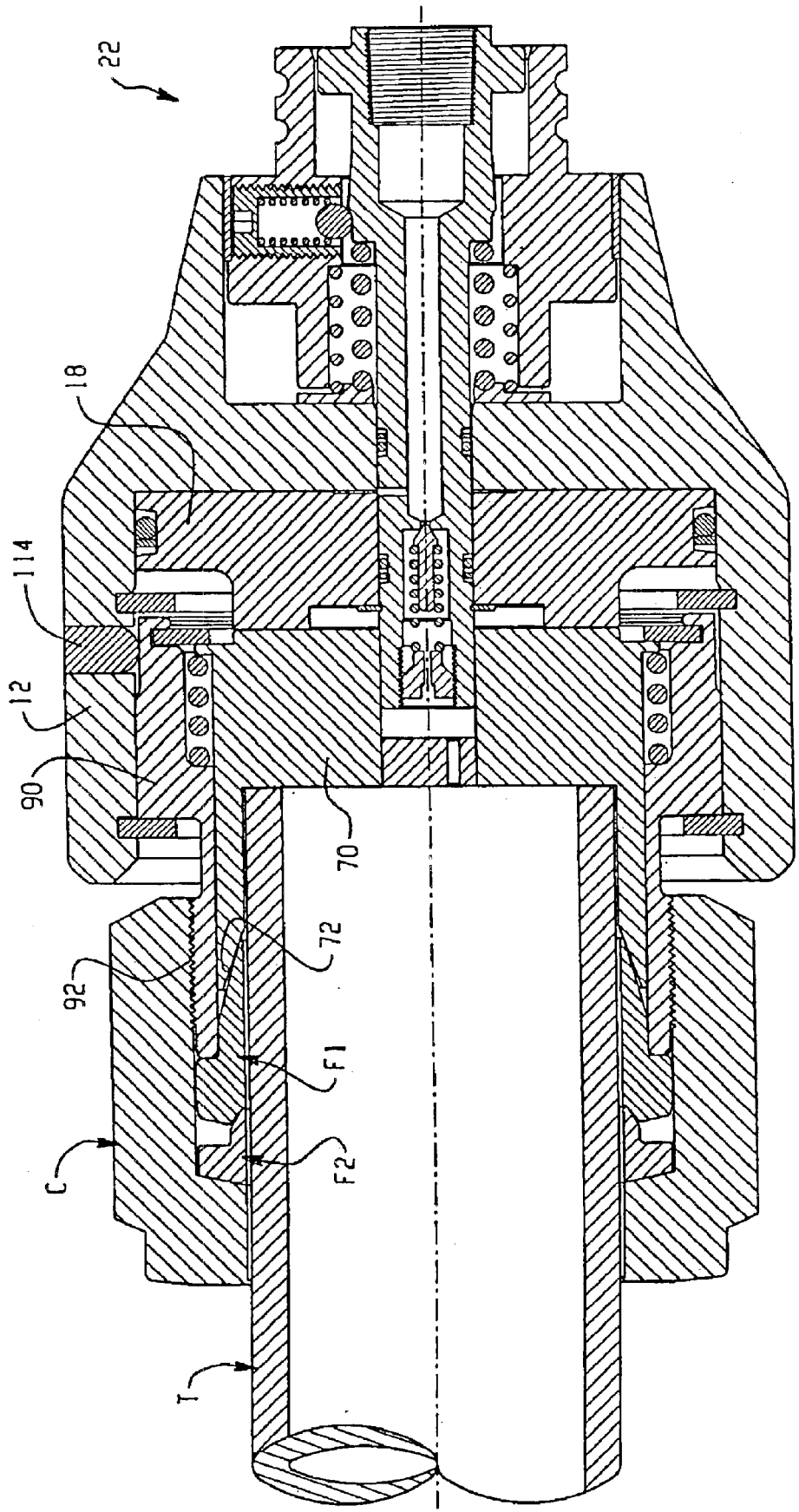
FIG. 6 is the apparatus of FIG. 1 illustrating a fluid coupling installed for a swaging operation.

With reference to FIGS. 1, 4 and 6, operation of the exemplary swaging apparatus 10 begins with the apparatus 10 in the condition illustrated in FIG. 1. If a swaging operation had been previously completed, the indicator knob 140 is manually pushed axially inward into the housing 12 by gripping the knob end 146 and pushing the knob 140 forward until the ball 166 engages the detent 162.

The hydraulic source is connected to the actuator shaft 24. A tube end T is inserted into the adapter assembly 112 until it bottoms against the die wall 76. In this example, a two-ferrule fitting is illustrated. Next a front ferrule F1 is slipped onto the tube end followed by a rear ferrule F2. A coupling nut C is then installed on the adapter sleeve 90 and tightened down to a hand tight position. In the hand tight position illustrated in FIG. 6, the coupling nut C forward end aligns with the last or inner most thread 92a on the adapter sleeve 90. This alignment in the hand tight position provides an indication that the ferrules F1 and F2 are installed properly and that the piston 18 is in the fully retracted initial position prior to a swaging operation.

The hydraulic pump 190 is then actuated. Hydraulic pressure builds behind the piston 18 and eventually moves the piston forward (leftward as viewed in FIGS. 1 and 4). As the piston advances, it pushes the swaging die forward against the bias of the spring 104 and the spring 160. The piston 18 also pushes against the piston retainer snap ring 46, thus also causing the shaft 24 to advance forward with the piston 24. As the die 70 advances, it swages the ferrules F1 and F2 onto the tube end T by a camming action of the tapered mouth 72 against the tapered nose of the front ferrule.

A proper swage is predetermined by the axial travel distance "Y" of the die 70 (FIG. 4). This distance is typically based on empirical data and design criteria and will vary based on the size of the fitting. This distance control is conveniently built into the adapter assembly by appropriate dimensioning of the swaging die 70 and the adapter 90 for the particular fitting to be used therewith. Thus for various fitting sizes there typically will be an associated number of adapter assemblies 112. For example, the tool 10 is typically designed to swage a variety of fitting sizes, wherein one of those fittings will require the maximum stroke. The swaging die 70 is appropriately sized to move this maximum distance Y in response to displacement of the piston 18 to produce a proper swaging action on the fitting having the highest stroke requirement. Note that the fitting having the largest stroke requirement need not necessarily be the largest sized fitting. For other fitting sizes that will be used with the tool 18 and require less stroke, the associated adapter assembly 112, and particularly the swaging die 70, are sized to include an appropriate dead space before the tapered mouth 72 contacts the front ferrule F1. This dead travel space can be conveniently built into the adapter assembly 112 (for example by controlling the length of the die 70) because the die 70 is pushed backwards relative to the adapter sleeve 90 by the return spring 104 when the hydraulic pressure is removed.

The stroke Y of the swaging die 70 is controlled by appropriate dimensioning of the washer 152. As the shaft 24 advances with the piston 18, the indicator knob 140 also advances forward until the knob contacts the top surface 152a of the washer 152. After this contact is made, further movement of the shaft 24 causes the indicator knob to be actuated. Thus, appropriate selection of the washer 152 dimensions will set the stroke of the die 70. This distance that the die 70 travels will be equal to the stroke Z of the piston plus the distance that the shaft 24 travels after the knob 140 hits the washer 152 until the balls 166 clear the detent 162, at which point the indicator knob pops out to indicate completion of the swaging operation. Over swaging is prevented by the piston 18 hitting the stop ring 58. If hydraulic pressure continues to build after the piston is stopped, the relief valve 120 will open and release the hydraulic pressure.

Figure 7A:
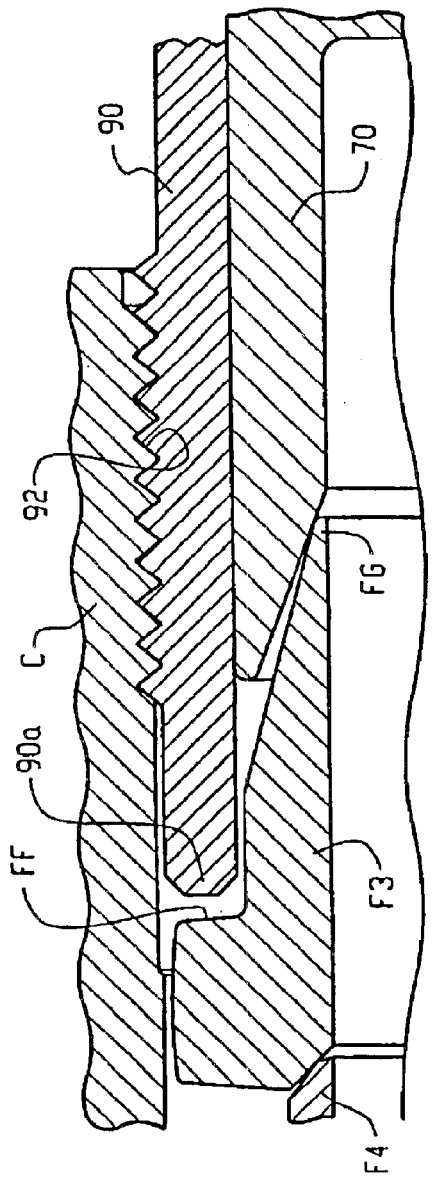
FIGS. 7A and 7B illustrate the use of a dead space between the swaging tool and the ferrule for fitting sizes other than the maximum swage stroke fitting.
Figure 7B:
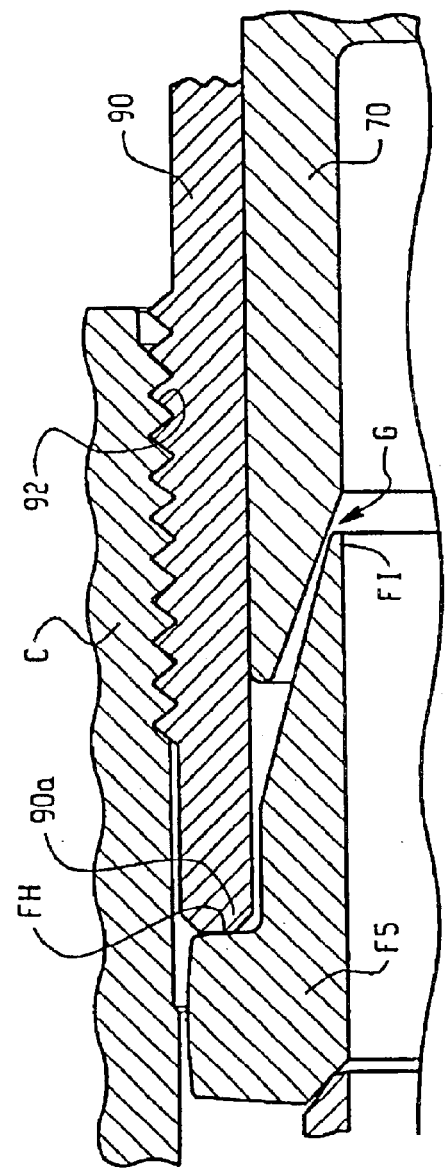

FIGS. 7A and 7B illustrate this dead space concept. In FIG. 7A there is illustrated a typical front ferrule F3 and rear ferrule F4 installed on a tube end (not shown) and inserted in the swaging tool 10 with the tool in the pre-swage condition. The coupling nut C is also shown installed on the threaded end 92 of the adapter sleeve 90. In this example, the ferrule F3 is that ferrule that requires the maximum piston 18 stroke, and hence the maximum swaging die 70 stroke, to swage the ferrules onto the tube end. Accordingly, the length of the adapter sleeve 90 is selected such that the forward end 90a of the sleeve 90 does not abut the ferrule F3 flange face FF before the die 70 engages the forward end FG of the ferrule F3. Therefore, all of the axial displacement of the die 70 is used for the swaging operation.

In FIG. 7B, a ferrule F5 is to be swaged that requires a shorter stroke of the die 70. Again, as in FIG. 7A, the components are shown in the assembled pre-swage position (corresponding to the set-up of FIG. 1). Since the piston 18 and the die 70 will always be displaced the same axial distance, some of that stroke will not be used for swaging the ferrule F4. As illustrated, the shorter ferrule F4 (as compared to the ferrule F3 that requires the maximum stroke) thus has its flange FH abut the free end 90a of the die 70 before the forward end FI of the ferrule engages the die 70, thus producing an axial gap or "dead space" G between the ferrule F5 and the die 70. As the piston 18 and the die 70 initially advance axially, this gap will first be taken up without any swaging action on the ferrule F5. The size of the gap G can be selected by appropriate dimensioning of the die 70 (keeping in mind that when the ferrule or fitting size changes, the adapter tool 112 which includes the sleeve 90 and the die 70 is also changed) so that only that portion of the total die displacement Y needed for a proper swage is actually used. By having the shorter stroke ferrules F5 engage the adapter sleeve 90 at the ferrule flange FH, a swaging operation always has a common starting point of the ferrule relative to the die 70. Therefore, the actual swage stroke can be precisely set by appropriate dimensioning of the die 70. This dead space feature will typically be used when the various sizes of ferrules to be swaged require different swage strokes, which corresponds to different thread pitch on the fitting.

Use of the washer 152 permits a convenient method for calibrating the apparatus 10. In any swaging tool, the stroke that the swaging die advances is important to assure that a proper swage was effected. However, there are tolerance stack-ups with the ferrules themselves and tolerance stack-ups in the adapter tool assembly 112. Therefore, it is desirable if the stroke of the piston 18 can be precisely controlled with zero error. In accordance with this aspect of the invention, the tool 10 is first assembled using a washer 152 of nominal axial dimension. The actual dimension is not critical. Next, a ferrule and tube end are installed in the same manner as if a swaging operation would be performed. Next, the indicator knob is reset to the pre-swage position illustrated in FIG. 1. Next, the operator relatively slowly advances the shaft 20 (which corresponds directly with advancement of the piston 18) until the indicator knob 140 is released. The axial displacement of the shaft/piston to the point of knob actuation is measured. If the measured displacement is not the desired displacement to effect a proper swage, the nominal washer 152 is replaced with a different washer 152 having an axial dimension selected such that the piston stroke will be precise, thus reducing to zero any error that could contribute to an incomplete or over swage. The distance of the piston stroke is selected to simulate or replicate the axial displacement of the coupling nut in a typical fitting during a pull-up operation of the fitting.

As the shaft 24 advances with the piston 18, the knob hits the washer 152 and thereafter further movement of the shaft 24 causes the detent balls 166 to ride up over the detent 162 by being displaced into the bore 164 against the force of the bias spring 168. When the detent 162 passes the ball 166, the indicator sleeve 140 is free to axially snap or pop rearward under the bias force of the indicator spring 156. The knob 140 hits the flange 186 and makes an audible click. Additionally, the outer surface 142a of the knob may be treated as with color or other finish to easily make a visual determination that the sleeve 140 is in the extended or post-swage position.

When the indicator knob 140 pops out, the operator knows immediately that the swaging operation is completed and can then relieve the hydraulic pressure. Once the pressure drops below a value that offsets the force of the shaft spring 160, the spring 160 returns the shaft 24 along with the piston 18 and the swaging die 70 to the position shown in FIG. 1. The operator manually resets the knob 140 as previously described hereinabove.

Figure 5:
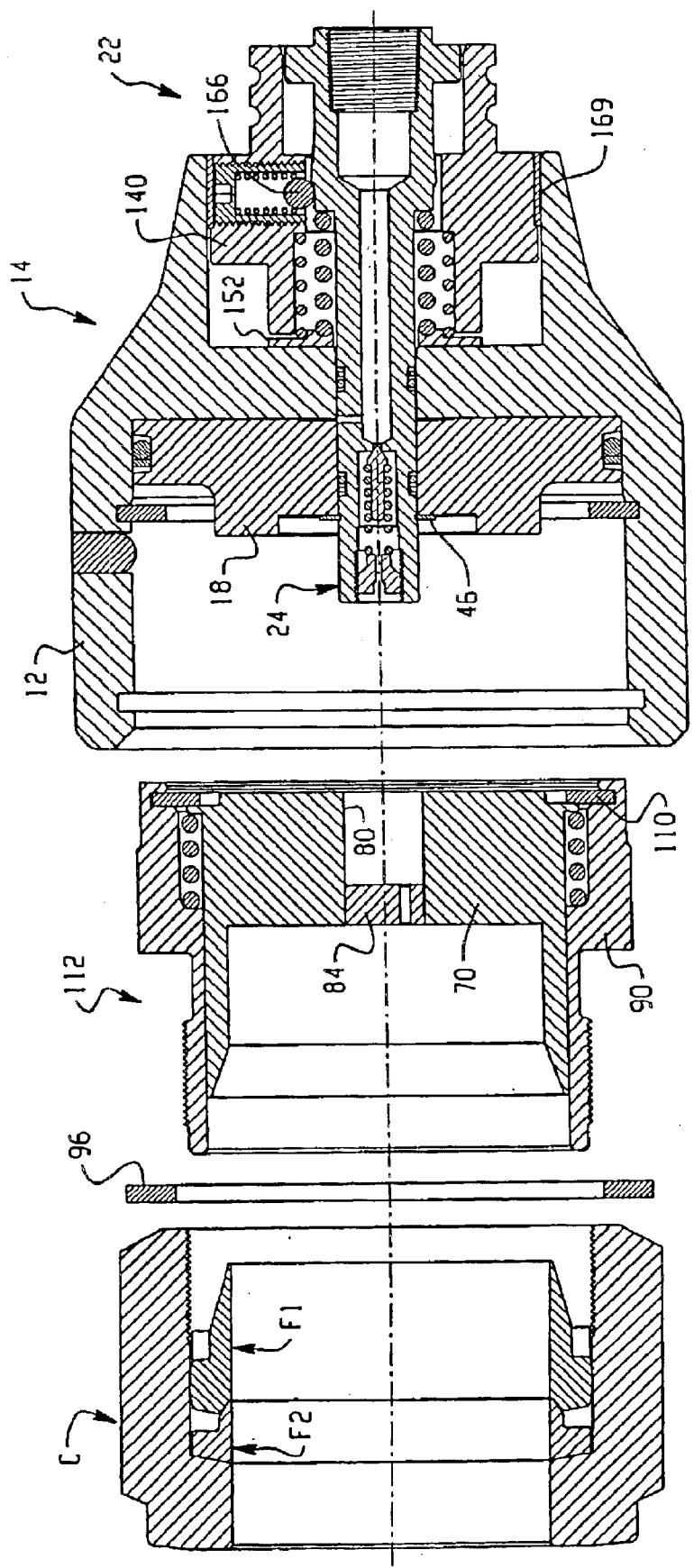
FIG. 5 is an exploded view of the apparatus of FIG. 1 illustrating installation features of the adapter tool.

FIG. 5 illustrates the main subassemblies of the apparatus 10. In accordance with another feature of the invention, a typical fitting assembly includes the coupling nut C and a front and rear ferrule F1, F2. By removing the adapter sleeve snap ring 96, the swaging section 16 in the form of the adapter assembly 112 can be removed as a single assembly to simplify size changeover. The hydraulic section 14 and the indicator assembly 22 remain installed in the housing 12 and no seals are disturbed or compromised as a result of removing the swaging section 16.

Additional visual indications are provided with the position of the indicator knob and the shaft. As illustrated in FIG. 1, the central body 142 of the indicator knob 140 is flush with the rear face of the housing 12, as at 194. Also, the shaft flange 186 is flush with the indicator knob, as at 196. In the initial pre-swage position of FIG. 1, these flush alignments indicate to the operator that the piston 18 and the shaft 24 are fully returned to the initial start position, the indicator knob has been reset, the tool 10 is not damaged and the hydraulic pressure in the tool has been released.

Obviously, modifications and alterations will occur to others upon a reading and understanding of this specification. It is intended to include all such modifications and alterations insofar as they come within the scope of the appended claims or the equivalents thereof.

What is claimed is:

1. Apparatus for installing a ferrule type fitting onto an outer wall of a cylindrical member by swaging the ferrule onto the cylindrical member, the fitting including a threaded coupling nut, the apparatus comprising: a housing; a piston in said housing with said piston being movable between a first position and a second position in response to fluid pressure when applied to said piston; and an adapter tool partially retained in said housing; said adapter tool comprising a sleeve that is threaded at one end to receive the coupling nut and an anvil; said anvil being moveable relative to said sleeve between a first anvil position and a second anvil position to swage a ferrule onto the cylindrical member; said anvil and sleeve having a slip fit installation into said housing and being retained in said housing by other than a threaded engagement.

2. The apparatus of claim 1 wherein said anvil is biased relative to said sleeve toward said anvil position that corresponds to an initial pre-swage position.

3. The apparatus of claim 2 comprising a spring captured between said sleeve and said anvil to bias said anvil towards said pre-swage position.

4. The apparatus of claim 1 wherein said piston moves a defined distance between its first and second positions during a swaging operation, said defined distance being less than a defined maximum stroke of said anvil relative to said sleeve; said defined distance being controlled in part by a positive stop to limit axial movement of said piston thereby preventing over swaging.

5. The apparatus of claim 1 wherein said piston and said anvil translate along a common axis; and an indicator that provides a visual indication to an operator that a swaging operation is completed; said indicator comprising a member that is displaced along said axis.

6. The apparatus of claim 5 wherein said indicator comprises a knob that is axially displaced between a first and a second position.

7. The apparatus of claim 6 wherein said knob is releasably retained in said first position by a detent device.

8. The apparatus of claim 6 wherein said knob moves relative to an actuator shaft that is coupled to said piston; said knob being biased to second position.

9. The apparatus of claim 8 wherein said knob moves to said knob second position after a predetermined relative axial movement between said knob and said shaft.

10. The apparatus of claim 9 wherein hydraulically pressure is applied to said piston by manual control of a fluid source by an operator; said knob moving to said knob second position to indicate to an operator to release hydraulic pressure.

11. The apparatus of claim 1 comprising an actuator shaft coupled to said piston; said shaft having a central bore therein that provides a fluid conduit for pressurized fluid to drive said piston.

12. The apparatus of claim 11 comprising a relief valve disposed within said shaft.

13. The apparatus of claim 1 wherein said anvil and sleeve are dimensioned independent of said housing and said piston so that different size anvil and sleeve combinations may be installed in said housing to accommodate swaging different sized fittings without changing said housing or piston.

14. The apparatus of claim 1 wherein said piston comprises a reduced diameter drive face that contacts a back side of said anvil; said piston reduced diameter drive face being sufficiently less than said sleeve inner diameter to form a circumferential space between said piston and said sleeve whereby sleeves having different sized inner diameters are used to swage correspondingly different sized ferrules.

* * * * *